No. 665,852. Patented Jan. 8, 1901.
W. A. & B. S. H. HARRIS.
TRAIN SIGNALING APPARATUS.
(Application filed June 28, 1900.)
(No Model.) 3 Sheets—Sheet 1.
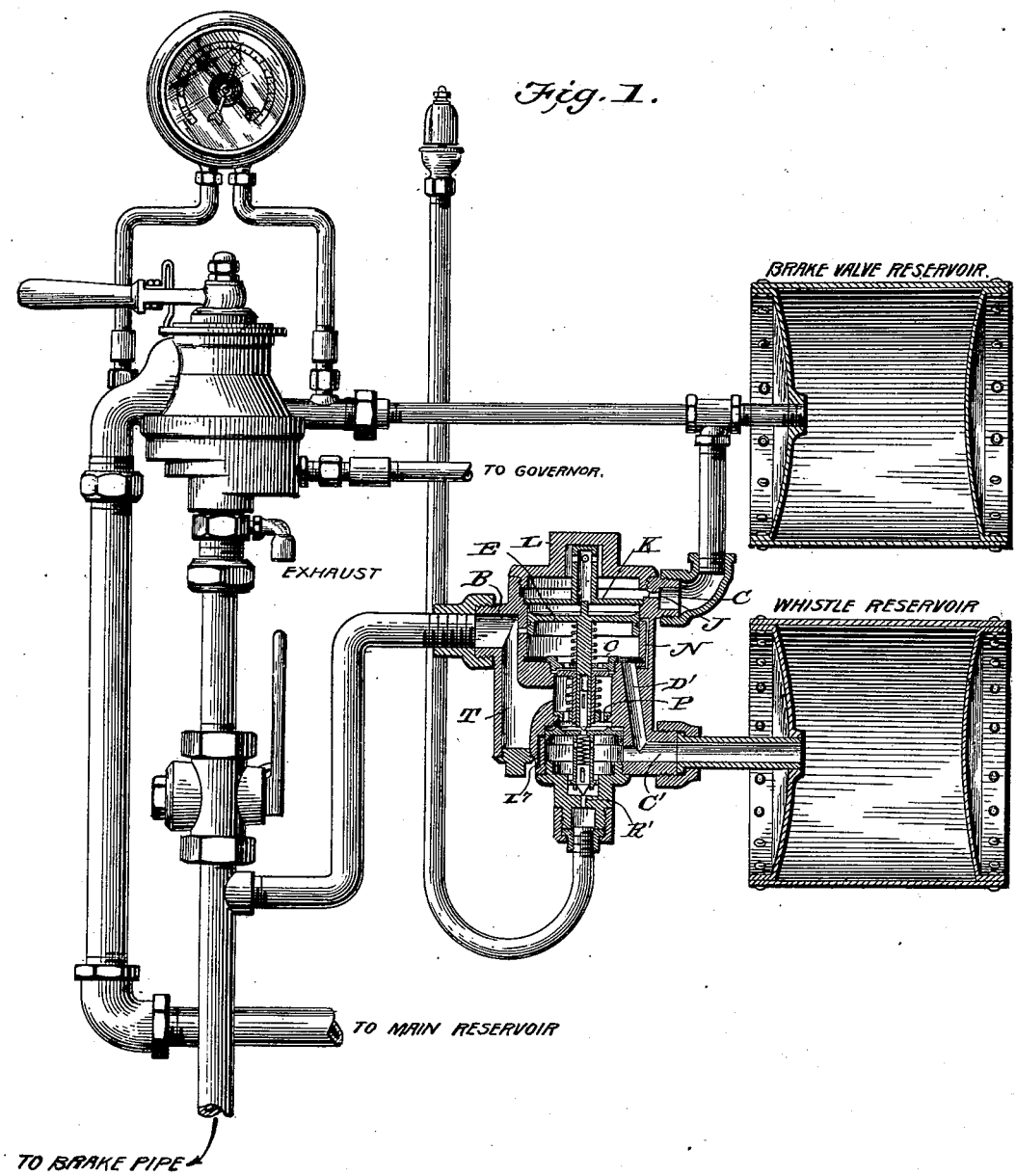

No. 665,852. Patented Jan. 8, 1901.
W. A. & B. S. H. HARRIS.
TRAIN SIGNALING APPARATUS.
(Application filed June 23, 1900.)
(No Model.) 3 Sheets—Sheet 2.
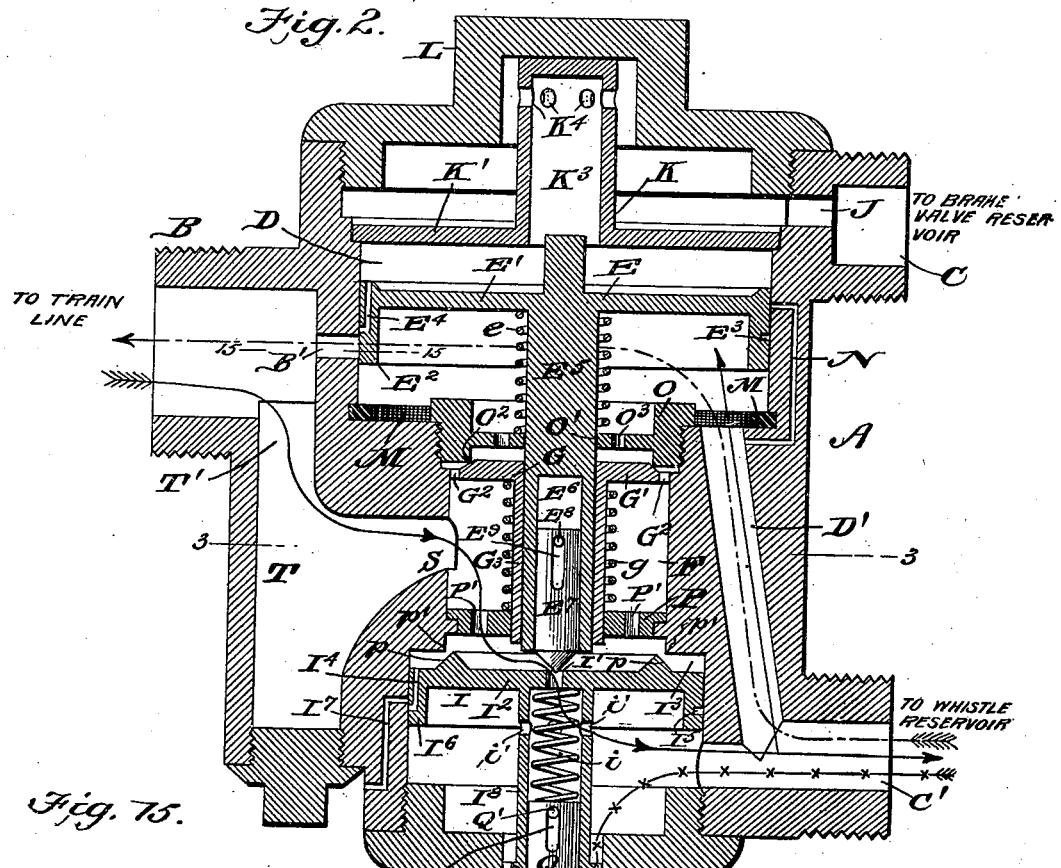
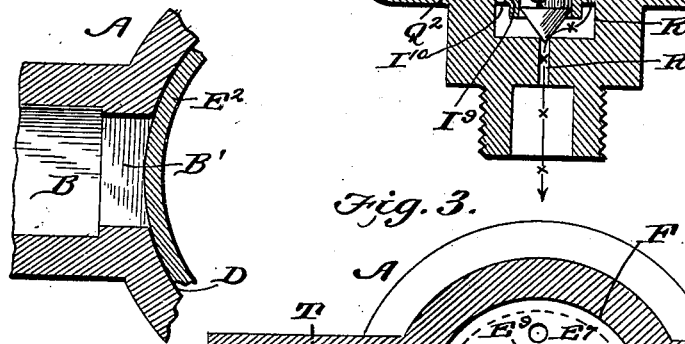
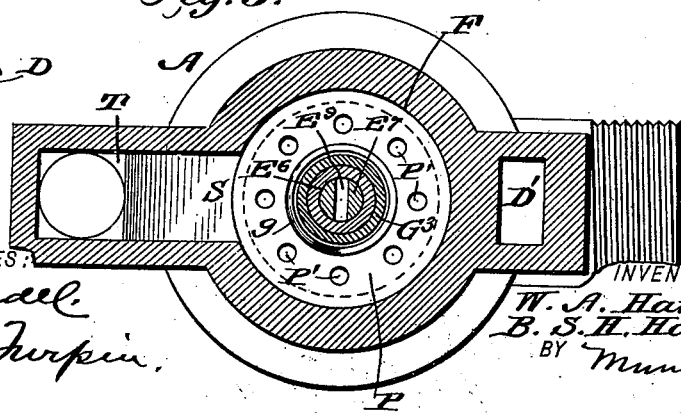
WITNESSES:
M. A. Blondel.
Perry B. Turpin.
INVENTORS
W. A. Harris,
B. S. H. Harris.
BY Munn
ATTORNEYS No. 665,852. Patented Jan. 8, 1901.
W. A. & B. S. H. HARRIS.
TRAIN SIGNALING APPARATUS.
(Application filed June 23, 1900.)
(No Model.) 3 Sheets—Sheet 3.
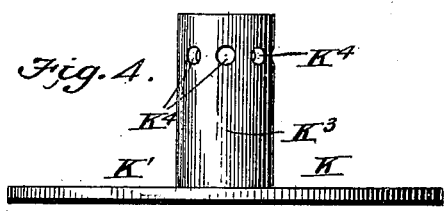
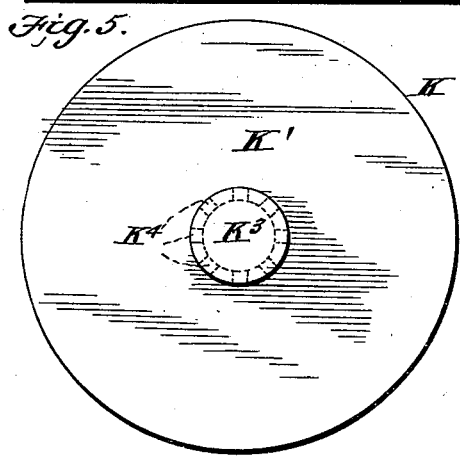
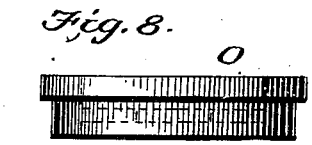
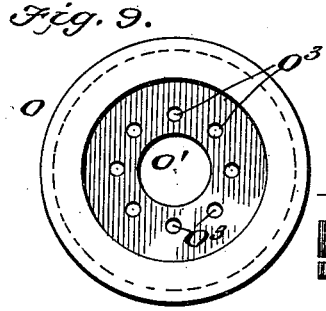
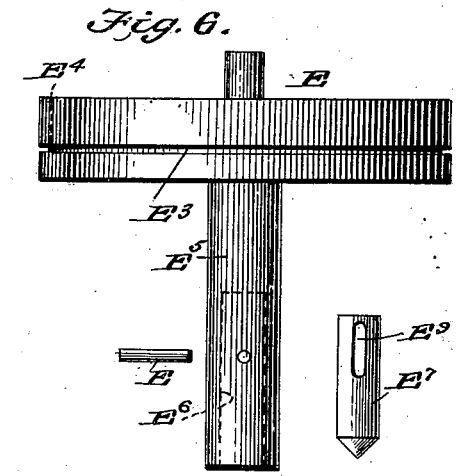
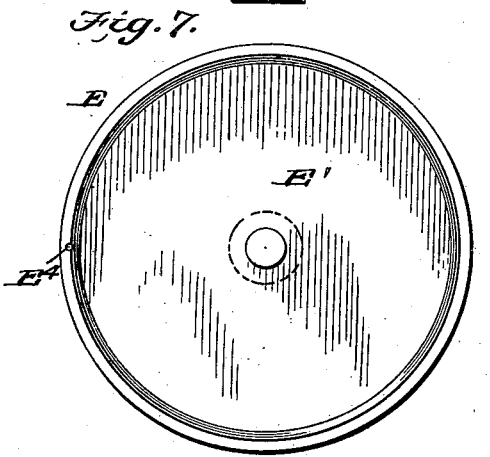
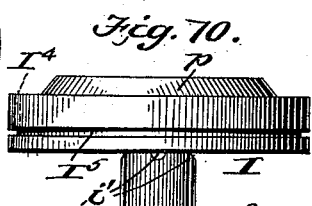
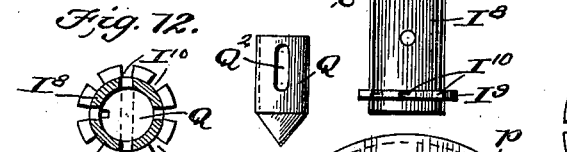
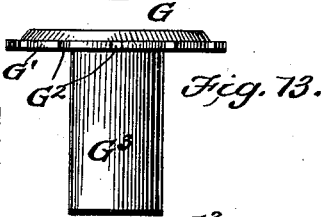
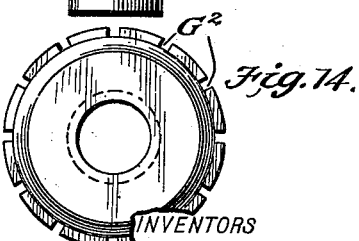
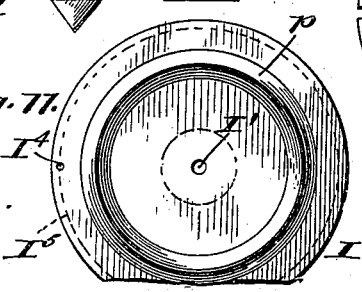
WITNESSES:
M. S. Blondel.
Perry B. Turpen.
INVENTORS
W. A. Harris.
B. S. H. Harris.
BY Munn & Co.
ATTORNEYS
THE NORRIS PETERS CO., PHOTO-LITHO., WASHINGTON, D. C.

UNITED STATES PATENT OFFICE.

WILLIAM ANDREW HARRIS AND BENJAMIN S. H. HARRIS, OF GREENVILLE, SOUTH CAROLINA.

TRAIN SIGNALING APPARATUS.

SPECIFICATION forming part of Letters Patent No. 665,852, dated January 8, 1901.

Application filed June 23, 1900. Serial No. 21,342. (No model.)

*To all whom it may concern:*

Be it known that we, WILLIAM ANDREW HARRIS and BENJAMIN S. H. HARRIS, of Greenville, in the county of Greenville and State of South Carolina, have invented a new and useful Improvement in Train Signaling Apparatus, of which the following is a specification.

This invention is an improvement in signaling devices for railway-trains employing what are known as "automatic air-brakes," wherein the brakes are held released by pressure in the brake or train pipe and are set by a proper reduction of pressure in said pipe.

The object of the present invention is to provide improved constructions whereby signals can be transmitted to the engineer by making a slight reduction of pressure in the train-pipe without necessitating the use of a separate signal-pipe paralleling the brake-pipe and in which a signaling device is placed in direct connection with the train-pipe and in a convenient location near the engineer's brake-valve, thus permitting the transmission of signals from any car or cars forming a part of a train equipped with air by making a slight reduction of pressure in the train-pipe by the operation of the conductor's discharge-valve, such slight reduction being insufficient to set the brakes.

In the present invention while the signaling devices are in direct communication with the train-pipe they do not form a part of such pipe or of the direct conduit for the air, so the volume of the air as it passes back and forth does not pass through the signaling apparatus. This is important, as it avoids fouling the signaling apparatus by the deposit of dust and dirt from the air, and in the signaling apparatus we provide means for trapping the dust and dirt in such air as passes into or through the said apparatus, and so prevent it from fouling the operating parts of the improvement.

The invention consists in certain novel constructions and combinations of parts, as will be hereinafter described and claimed.

In the drawings, Figure 1 is a sectional view of the improved signaling apparatus connected up as for use. Fig. 2 is a detail enlarged view of the signaling apparatus, showing the several parts in normal position. Fig. 3 is a cross-sectional view on about line 3 3 of Fig. 2. Fig. 4 is a detail side view, and Fig. 5 a top plan view, of the dust-guard. Fig. 6 is a side view, and Fig. 7 a top plan view, of the main valve. Fig. 8 is a side view, and Fig. 9 a top plan view, of seat-plate for the emergency-valve. Fig. 10 is a side view, and Fig. 11 a top plan view, of the emergency-valve. Fig. 12 is a detail cross-section on about line 12 12 of Fig. 10. Fig. 13 is a side view, and Fig. 14 a top plan view, of the emergency-valve; and Fig. 15 is a detail cross-section on about line 15 15 of Fig. 2.

In the construction shown we employ a casing A, which is provided with a nipple B, through which connection is made with the train-line, with a nipple C, through which connection is made with the brake-valve reservoir or what is known as the "little black drum," and with a nipple C', through which connection is made with the whistle-reservoir.

Our invention involves no change in the ordinary air-brake system, and it will not be necessary to enter into any extended description of the construction or operation of such system, except in connection with the operation of the improved signaling apparatus, which will be described.

It should be noticed that the signaling apparatus while in direct communication with the train-line through which the air passes back and forth is not a part of such train-line, so that the volume of air does not play back and forth through the signaling apparatus in the ordinary operation of the brake devices. By this means we avoid the fouling of the signaling apparatus by the deposit of dust and dirt from such volume of air, as will be readily understood from the drawings.

Within the casing A, at the upper end thereof, we form a cylinder D, in which operates the piston E' of the main valve E, and below the cylinder D we form a cylinder F, in which operates the emergency-valve G, and below this cylinder F we form a cylinder H, in which operates the whistle-valve I. The cylinder H communicates below the piston of the valve I with the nipple C' through a port H', and the cylinder D communicates below the piston E' with the nipple C' through a passage D', and a port J establishes communication between the upper end of the cylinder D and the nipple C. The air from the brake-valve reservoir operates above the piston E', and the dust and dirt in said air are trapped above said piston by means of the dust-guard K, which comprises a base-plate K', which is imperforate, as shown, and is seated at $K^2$ in the casing, and an upwardly-projecting central tube $K^3$, which is perforated at $K^4$ near its top for the passage of the air to the main valve. This dust-guard K is held in place by the cap L of the casing, such cap being screwed to place and pressing the dust-guard firmly upon its seat, as shown in Fig. 2. In the operation of this dust-guard the air from the brake-valve reservoir will eddy above the base-plate K' and all dust and dirt therein will be deposited, the pressure passing through the openings $K^4$ to operate above the piston E' of the main valve, as will be understood from Fig. 2. At the outer edge of the piston E' we provide the rim or flange $E^2$, which is provided in its outer side with an annular groove $E^3$, from which a port $E^4$ extends upward and opens above the piston E' for the passage of pressure in equalizing, as will be more fully described hereinafter. The lower edge of this rim $E^2$ also seats, in the lowermost position of the main valve, on a packing M, and within the casing we provide a port or passage N, which is arranged at its lower end to communicate with the passage D' and opens at its upper end into the cylinder D at a point above the piston of the main valve when the latter is in its lowermost position and seated on the packing M.

The groove $E^3$ is arranged in equalizing the pressure above and below the piston to register with a port B' in the side of the cylinder D and communicating with the nipple B, so the pressure above the piston E' can be equalized with that in the train-line, as will be more fully described.

The main valve E is provided below the piston E' with a central depending stem $E^5$, whose lower end is provided with a socket $E^6$, in which is fitted a plug-valve $E^7$, which drops by gravity and whose movement is limited by a pin $E^8$, secured to the stem $E^5$ and operating in a slot $E^9$ in the plug-valve $E^7$, as shown in Fig. 2. The lower end of the plug-valve $E^7$ is tapered and operates in an opening or port I', formed in the piston of the whistle-valve, as presently described.

The stem $E^5$ of the main valve operates through a central opening O' in the plate O, which furnishes bearing for one end of the spring $e$ and also forms at its under side at $O^2$ a seat for the piston of the emergency-valve G, before referred to. This plate O is perforated at $O^3$ for the passage of pressure and is threaded in place at the upper end of the cylinder F.

The emergency-valve G has at its upper end the piston-like portion G', which is notched in its outer edge at $G^2$ for the passage of pressure and has a valve-surface within said notches which seats at $O^2$ against the seat-plate O, as shown in Fig. 2. The emergency-valve also has a tubular portion $G^3$, which encircles and slides upon the lower end of the stem $E^5$ of the main valve E, and this tubular portion $G^3$ fits and is guided in a central opening formed in a guide-plate P, which is suitably supported at the lower end of the cylinder F and forms a guide for the emergency-valve and a bearing for the lower end of the spring $g$, which actuates the emergency-valve normally upward.

The plate P is perforated at P' for the passage of pressure to and from the whistle-valve. The whistle-valve I has its piston $I^2$ arranged to operate in the upper portion of the cylinder H and is provided on the upper side of said piston with surfaces at $p$, which seat at $p'$ in the uppermost position of the valve I and operate to divide or separate an annular space at the outer edge of the piston $I^2$ when the valve I is moved upward in sounding the whistle. This annular space at $I^3$ communicates by a small port $I^4$ with an annular groove $I^5$, formed in the outer face of the rim $I^6$ of the whistle-valve and arranged to register, when the valve I is moved upward to its uppermost position, with a port $I^7$, leading through the casing to the atmosphere. When the valve is moved up to its uppermost position, the groove $I^5$ registers with the passage $I^7$ and the air in the space $I^3$ exhausts to the atmosphere. The purpose of this construction and operation is to reduce the area of the whistle-valve exposed to pressure on its upper side when such valve is moved upward to sound the whistle, so that the excess of exposed area on the under side of the piston $I^2$ will operate to cause the pressure to hold the piston firmly to its seat and prevent the whistle from being sounded in a number of repeated sounds instead of a steady whistle, because of the rebounding of the valve from the pulsation of the air in the main line. The whistle-valve is provided with a depending tubular portion $I^8$, whose lower end is open and receives the plug-valve Q, which controls the port R, leading to the whistle. The lower end of the tube $I^8$ is provided with a circumferential flange $I^9$, operating in a guideway R' in the casing and notched at $I^{10}$ for the passage of pressure to the whistle-port. The plug Q is held to the tubular stem $I^8$ by a pin Q' passing through a slot $Q^2$ in the plug Q, permitting a limited play of the plug Q in the tubular stem $I^8$, the plug being pressed normally down by the spring $i$, as shown in Fig. 2. The port I' in the piston $I^2$ leads into the upper end of the stem $I^8$, and this stem is provided with ports $i'$ for the passage of the pressure.

In Figs. 1 and 2 the several parts of the apparatus are shown in normal position, in which the plug Q is pressed downward to close the port R, the plug $E^7$ is supported slightly off its seat to permit the passage of pressure through the port I', the whistle-valve is clear of its seat $p'$, the emergency-valve is seated at $O^2$, and the main valve is adjusted to close the port B'. In this adjustment the port $I^7$ is also closed, as is the passage N.

We have indicated in Fig. 2 the direction of the passage of air from the train-line through the signaling apparatus into the whistle-reservoir in reversing the pressure in the latter after the sounding of the whistle by a solid line, (thus ————,) the passage of air from the whistle-reservoir through the signaling apparatus to the train-line in the application of the brakes is indicated by a dash-and-dot line, (thus —.—.—.,) while the dash-and-cross line (thus —x—x—x) indicates the passage of the air from the whistle-reservoir to the whistle in sounding the latter as desired.

In the service application of the brakes the pressure of air above the main valve is reduced by the initial reduction of pressure in the brake-valve reservoir, so such main valve as the brakes are applied will move upward to open the port B' to permit the passage of pressure from the whistle-reservoir into the main line in the dash-and-dot line. (Shown in Fig. 2.)

In operation if the discharge-valve be moved to reduce the pressure in the main line the pressure above the whistle-valve will be reduced and the said valve will move up quickly and the whistle will be sounded by the pressure from the whistle-reservoir.

In case the engineer's valve is on lap, which would operate to shut off communication between the brake-valve reservoir and the main line, and the whistle should then be operated by a reduction of pressure in the main line by the discharge-valve the pressure will become less below the piston of the main valve and it will move down until the groove $E^3$ communicates with the port B', which will permit the pressure in the main line and that above the piston of the main valve to equalize, so the main valve will not move down sufficiently to hinder the operation of the whistle-valve. The port N operates to equalize the pressure above and below the main valve and in the signal-reservoir in releasing the brakes by permitting the pressure to pass at such time from above the main valve down through passage N to the passage D' and thence to the signal-reservoir.

The main valve is an important feature and performs a number of functions. Thus in the normal position of the parts it covers the port B' and prevents the air from passing through said port and thence into the whistle-reservoir. It also travels up and uncovers said port B' when the brakes are being set and allows the air to pass from the whistle-reservoir freely to the main line. In this last operation the air passes from the whistle-reservoir through passage D' into the cylinder below the main valve and thence through port B' to the main line.

It will be understood from the foregoing that in ordinary application of the brakes or, as it is known, the "service" application, the pressure is first reduced in the little black drum or brake-valve reservoir and the main valve moves up to uncover the port B', and the pressure from the whistle-reservoir passes out, as indicated in the dash-and-dot line in Fig. 2; but in the emergency application the pressure in the main or train line is exhausted directly into the air, and the preliminary or advance reduction in the brake-valve reservoir does not take place. Therefore in such operation the main valve will not move up to uncover the port B'. At this time the great reduction in pressure below the emergency-valve permits the said valve to be forced down and off its seat $O^2$, so the pressure from the whistle-reservoir will pass off to the train-line through the port S. In this last operation the air passes from the cylinder F through a port S into a chamber T, which communicates through a port T' with the nipple B, and thence with the train-pipe. The chamber T is dropped below the port S, so the dust in the air from the train-pipe in charging the whistle-reservoir will be deposited in the chamber T and be prevented from passing to the operating parts of the signaling apparatus.

In the emergency application the main valve will be forced down to its seat M and will remain so until the pressure is equalized through the contracted port N. It will be noticed that the main valve is of greater area than the whistle-valve, so that the main valve controls the whistle-valve and prevents any sounding of the whistle in the emergency application of the brake.

We find it desirable to employ the passage N for filling and equalizing during the release of brakes and in the emergency application instead of filling and equalizing through the port I', because if the filling should be effected through the port I' the whistle-reservoir, by reason of the relatively large size of such port, would fill too rapidly and the whistle would be sounded by the reduction in the train-line incident to the filling of the auxiliaries under the cars of the train in the usual operation of recharging the train-line, while by filling slowly through the passage N the whistle-reservoir will not be charged in advance of the filling of the auxiliaries.

It will be noticed that the main valve, emergency-valve, and whistle-valve are in line and the operation is direct.

It should be understood, as before suggested, that the full line in Fig. 2 illustrates the passage of the air to the whistle-reservoir in renewing the pressure in the latter after it has been reduced by the passage of the air to the whistle; but it should also be understood that in the initial charging of the apparatus with air the charging of the train-line will operate also to charge the brake-valve reservoir through the usual connections and the main valve will travel down, closing the port I' and pressing the whistle-valve firmly to its seat, so the air cannot pass through the port S and thence through the port I' to the whistle-reservoir. This downward movement of the main valve in the initial supply of pressure uncovers the upper end of the passage N and permits the passage of pressure from the brake-valve reservoir through the passage N and down through the passage D' to the whistle-reservoir to charge the latter until the pressure is equalized above and below the main valve, when the parts will have assumed the positions shown in Fig. 2, and the operations may proceed as before.

Having thus described our invention, what we claim, and desire to secure by Letters Patent, is—

1. A signaling apparatus for a fluid-pressure brake system comprising a casing in communication with, but out of the line of the main train-pipe whereby to avoid the dirt in the air passing back and forth in the main train-pipe, the signal, and devices in said casing by which to effect the operation of the signal by the proper reduction of pressure in the train-pipe.

2. A signaling apparatus for a fluid-pressure brake system comprising a casing out of the line of the train-pipe and having means for connection with the main train-pipe whereby the pressure in such pipe may operate in the casing, the latter being also provided with means for connection with the brake-valve reservoir and with the whistle-reservoir, the signal, and devices in the casing for controlling the operation of the signal.

3. In an apparatus substantially as described the combination with the train-line, the brake-valve reservoir, and the signal-reservoir, of the signaling apparatus having a casing connected with but not forming a part of the train-line, connections between said casing and the brake-valve reservoir, and the devices in said casing arranged to control the operation of the signal.

4. A casing having a connection with the train-pipe, a connection with the brake-valve reservoir and a connection with the signal-reservoir and provided with a port through which pressure passes from the signal-reservoir to the train-pipe, the main valve adapted to control said port and arranged for operation in the service application of the brakes by a reduction of pressure in the brake-valve reservoir to uncover the said port and permit the flow of pressure through the same from the signal-reservoir to the train-pipe.

5. In an apparatus substantially as described, the casing having a connection with the train-line but not forming a part of said line, means connecting said casing with the brake-valve reservoir and with the signal-reservoir, and devices in said casing, controlled by the reduction of pressure in the brake-valve reservoir, by which to establish communication between the signal-reservoir and the train-line in the service application of the brake.

6. In an apparatus substantially as described, the combination of the casing having connections with the train-line, the brake-valve reservoir, and with the signal-reservoir, the signal-valve and the main valve arranged to be set, by the emergency reduction of pressure in the train-line to position to prevent the operation of the signal-valve in the emergency application of the brakes.

7. In a fluid-pressure brake system, the combination of the train-line, the brake-valve reservoir, the signal-reservoir, the signaling apparatus including a casing having a connection with but not forming a part of the train-line, connections between the casing and the brake-valve reservoir, and the signal-reservoir, and the signal-valve and main valve, operating in the casing.

8. In an apparatus substantially as described, the casing having a whistle-valve and means whereby the same may be operated by a slight reduction of pressure in the train-line, a main valve, connections between the casing and the brake-valve reservoir whereby the pressure in the latter may operate the main valve, and a dust-trap between the said reservoir and the main valve.

9. The combination in an apparatus substantially as described of the casing, having a port or opening through which it may communicate with the brake-valve reservoir, and the dust-guard arranged in the casing between said opening and the main valve and having a base-plate and a projecting tube perforated above the base-plate for the passage of pressure to the main valve.

10. The combination of a valve having a piston provided in its rim with a circumferentially-extended groove and with a passage extending from the face of the piston and communicating with said groove and the casing having a cylinder for said piston and a port with which the groove in the piston may communicate.

11. The combination of the piston having a valve-surface within its rim and the casing having a seat for said valve-surface whereby when the valve is seated a portion of its surface is cut off or separated and means whereby the pressure above said cut-off portion may be vented to the atmosphere when the valve is seated, whereby the exposed area at the upper side of the valve may be reduced when said valve is seated.

12. The combination of the casing having a whistle-port, a cylinder for the piston of the whistle-valve and ports or passages above and below the valve's piston, and the whistle-valve having a piston and a tubular stem perforated for the passage of pressure, and the plug arranged in said stem and fitted to control the whistle-port.

13. In an apparatus substantially as described, the combination of the signaling device having a casing, the main line, the brake-valve reservoir, and the whistle-reservoir, connections between the said reservoir and main line through the casing, the whistle-valve and the main valve arranged for operation in the service application of the brakes to open communication between the whistle-reservoir and the main line.

14. In a fluid-pressure brake system, the combination of the train-line, the brake-valve reservoir, the casing connected with such parts, the whistle-valve in the casing, and the main valve by which to hold the whistle-valve closed in the emergency application of the brakes.

15. In an apparatus substantially as described, the combination of the casing arranged for connection with the main line and with the brake-valve reservoir, the whistle-valve and the main valve arranged to move to position to hold the whistle-valve from opening in the emergency application of the brakes, a port or passage being provided to establish communication between the opposite sides of said main valve when so moved whereby to slowly equalize the pressure to permit the readjustment of the main valve to normal position.

16. In a fluid-pressure brake system, the combination of the train-pipe, the brake-valve reservoir, the whistle-reservoir, the casing, the main valve, the whistle-valve and the emergency-valve arranged between the main valve and the whistle-valve and arranged to be opened by the pressure on its side next the main valve when the pressure is released on its opposite side in the emergency application of the brakes.

17. In an apparatus substantially as described, the combination of the casing, the whistle-valve, the main valve, and connections whereby fluid-pressure may operate in the service application of the brakes to move the main valve away from the whistle-valve and in the emergency application to move the main valve toward the whistle-valve to hold the same closed.

18. In an apparatus substantially as described, the combination of the casing having a cylinder D and a port B' leading thence to the train-line connection, and a passage D' leading from the cylinder D to the whistle-reservoir connection, the whistle-valve and the main valve arranged to cover the port B' in the normal position of the parts and to open said port to establish communication between the train-line and the whistle-reservoir in the service application of the brakes.

19. In an apparatus substantially as described, the combination of the casing having a cylinder for the main valve, and a port B' leading thence to the train-line connection and a port or opening for connection with the brake-valve reservoir, and the main valve having an opening or passage $E^4$ through which the pressure in the main line and in the brake-valve reservoir can equalize when the whistle is operated by a slight reduction in the train-line when the engineer's valve is on lap.

20. The combination of the casing having cylinders for the main valve, the emergency-valve and the whistle-valve, and ports or openings for connection with the whistle, the train-line, and the whistle-reservoir and brake-valve reservoir and provided with a passage D' leading from the whistle-reservoir connection to the cylinder for the main valve, and with a port B' leading from such cylinder to the train-line connection, the emergency-valve between the main valve and the whistle-valve, the whistle-valve, and the main valve controlling the port B' and having its stem extending through the emergency-valve and arranged to operate on the whistle-valve.

21. The combination of the casing the whistle-valve therein, the whistle-reservoir arranged to communicate pressure on one side of the whistle-valve to move the same, means whereby pressure on the opposite or outer side of said valve may be released by a slight reduction in the train-line, and means whereby the exposed area of the said outer side of the valve may be reduced when the valve is moved to whistling position.

22. In a fluid-pressure brake system, the casing having connections for the main line and for the whistle-reservoir and brake-valve reservoir, and having a chamber for the emergency-valve communicating through a port S with the train-line, the whistle-valve, the main valve, the passage D', and the emergency-valve arranged to open and establish communication from the whistle-reservoir through passage D' and port S to the main line in the emergency application of the brakes.

23. In an apparatus substantially as described the combination of the casing having cylinders or chambers for the main valve, the emergency-valve and the whistle-valve, said chambers being in alinement, and the concentric valves arranged in said chambers, the casing being provided with means for connection with the main line, the whistle-reservoir and the brake-valve reservoir substantially as described.

24. In an apparatus substantially as described the combination of the casing having the whistle-port, the whistle-valve having the valve proper and the piston yieldingly connected therewith, said piston being provided with a port I' for the passage of pressure, and means for reducing the opening of said port in the normal position of the parts, the said piston being arranged to lower when the pressure below it is reduced by the sounding of the whistle to enable the rapid reëstablishment of pressure in the whistle-reservoir through the unobstructed port I'.

25. In an apparatus substantially as described, the combination of the casing, the whistle-valve having a piston provided with a port through which pressure may leak to avoid sounding the whistle by slow leakage along the train-line, and means whereby said port may be closed when the piston moves upward by the operation of the pressure below it in sounding the whistle.

WILLIAM ANDREW HARRIS.
BENJAMIN S. H. HARRIS.

Witnesses:
J. P. GAINES,
L. B. RISER.